United States Patent [19]

Hayashi et al.

[11] Patent Number: 4,875,336
[45] Date of Patent: Oct. 24, 1989

[54] EXHAUST GAS EMISSION CONTROL DEVICE FOR DIESEL ENGINE

[75] Inventors: Kotaro Hayashi, Susono; Sumio Ito, Gotenba; Kiyoshi Kobashi, Mishima, all of Japan

[73] Assignee: Toyota Jidosha Kabushiki Kaisha, Japan

[21] Appl. No.: 291,274

[22] Filed: Dec. 28, 1988

[30] Foreign Application Priority Data

Jan. 12, 1988 [JP] Japan ................................. 63-001708
Mar. 18, 1988 [JP] Japan ................................. 63-063655

[51] Int. Cl.⁴ ............................................. F01N 3/02
[52] U.S. Cl. ....................................... 60/286; 55/302; 55/314; 55/466; 55/DIG. 30; 60/288
[58] Field of Search ........................ 60/286, 288; 55/DIG. 30, 302, 312, 313, 314, 466

[56] References Cited

U.S. PATENT DOCUMENTS

| | | | |
|---|---|---|---|
| 3,110,300 | 11/1963 | Brown | 55/302 |
| 3,908,367 | 9/1975 | Bauman | 55/302 |
| 4,217,757 | 8/1980 | Crone | 60/288 |
| 4,759,781 | 7/1988 | Olson | 55/302 |

FOREIGN PATENT DOCUMENTS

| | | | |
|---|---|---|---|
| 57-63106 | 4/1982 | Japan . | |
| 180715 | 10/1983 | Japan | 60/311 |
| 61-223215 | 10/1986 | Japan . | |
| 62-210212 | 9/1987 | Japan . | |

Primary Examiner—Douglas Hart
Attorney, Agent, or Firm—Oliff & Berridge

[57] ABSTRACT

An exhaust gas emission control device comprising a filter provided in the exhaust passage, a heater provided near the filter, first and second passage bypassing the filter and the heater, a single first valve upstream of the filter a single second valve downstream of the filter, and a controller controlling the first and the second valve. When trapping particles, one of or both of the first and second valves closes the first and second passages, and the first and second valves open the exhaust passage, whereby exhaust gas flows through the filter and the heater. On the other hand, when regenerating the filter, the heater is switched ON, the first valve shuts the exhaust passage and the second valve is open to a predetermined degree, so that exhaust gas flows into the first passage, and a part of the exhaust gas flowing via the first passage flows through the heater, the filter, and the second passage.

15 Claims, 7 Drawing Sheets

EXHAUST GAS EMISSION CONTROL DEVICE FOR DIESEL ENGINE

BACKGROUND OF THE INVENTION

1. Field of the Invention

The present invention relates to an exhaust gas emission control device for a Diesel engine.

2. Description of the Related Art

A known exhaust gas emission control device for a Diesel engine comprises a honeycomb ceramic filter provided in the exhaust passage to trap particles and to prevent a discharge of particles contained in an exhaust gas to the outside air.

The filter becomes clogged after long term use, and thus must be regenerated. Therefore, a heater means, for example, an electric heater, is provided upstream of the filter, and power is supplied to the heater at a predetermined intervals to burn inflammable particles, for example, carbon particles, trapped in the filter, whereby the filter is regenerated.

In this method of regeneration, however, heat is produced by burning the particles trapped and accumulated on the filter, and if a large amount of particles has accumulated on the filter, the filter can be destroyed, i.e., melted, by the heat of the burning particles.

On the other hand, if only a small amount of particles has accumulated on the filter, the heat is not propagated to the particles at the back of the filter, and thus the regeneration of the filter is not complete.

To solve the above problem, Japanese Unexamined Patent Publication No. 61-223215, disclosed an exhaust gas emission control device which comprises a heater provided near the end surface of the filter, first and second bypass pipes which bypass the filter, and five valves for controlling the flow of exhaust gas in the bypass pipes and the filter. In this device, when particles are to be trapped the exhaust gas does not flow through the first and second bypass pipes, but through the filter and the heater, and is then discharged to the atmosphere. But when the filter is to be regenerated, to ensure that the filter is not melted, the exhaust gas flows through the first bypass pipe, the heater, the filter, and the second bypass pipe, in this order, and is then discharged to the atmosphere, and at the same time, the heater is activated and ignites and burns the trapped particles.

In this device, however, five valves are needed so that the direction of flow of the exhaust gas in the filter can be reversed when regenerating the filter, and these five valves must be controlled, respectively, by five actuators.

In the above-mentioned device, because five valves and five actuators are needed, not only the control of the five actuators but also the construction of this device is complicated, and it is not easy to mount the device to a vehicle.

SUMMARY OF THE INVENTION

An object of the present invention is to provide an exhaust gas emission control device by which the size of the device can be reduced.

According to the present invention, there is provided an exhaust gas emission control device for a Diesel engine having an exhaust passage for discharging exhaust gas to the atmosphere, the device comprising: a filter provided in the exhaust passage for trapping particles in the exhaust gas; a heater provided in the vicinity of the filter to ignite particles accumulated on the filter and thus regenerate the filter; a first passage connecting a first connecting portion located upstream of the filter to a second connecting portion located downstream of the filter; a second passage connecting a third connecting portion located upstream of the filter to a fourth connecting portion located downstream of the filter; a first valve provided upstream of the filter; a second valve provided downstream of the filter; and a control means for controlling the first and second valves. The control means controls the first and second valves in such a manner that, when a regeneration of the filter is not carried out, the first valve and/or the second valve closes the first and second passages at the first and third connecting portions and/or at the second and fourth connecting portions, and the first and second valves open the exhaust passage, to allow exhaust gas to flow through the filter and the heater, and when a regeneration of the filter is to be carried out, the first valve closes the exhaust pipe between the first connecting portion and the third connecting portion, and the second valve is opened to a predetermined degree so that exhaust gas flows in the first passage, a part of exhaust gas flowing in the first passage flows through the heater, the filter, and the second passage, in that order.

The present invention may be more fully understood from the description of the preferred embodiments of the invention set forth below, together with the accompanying drawings.

DESCRIPTION OF THE PREFERRED EMBODIMENTS

Figure 1:
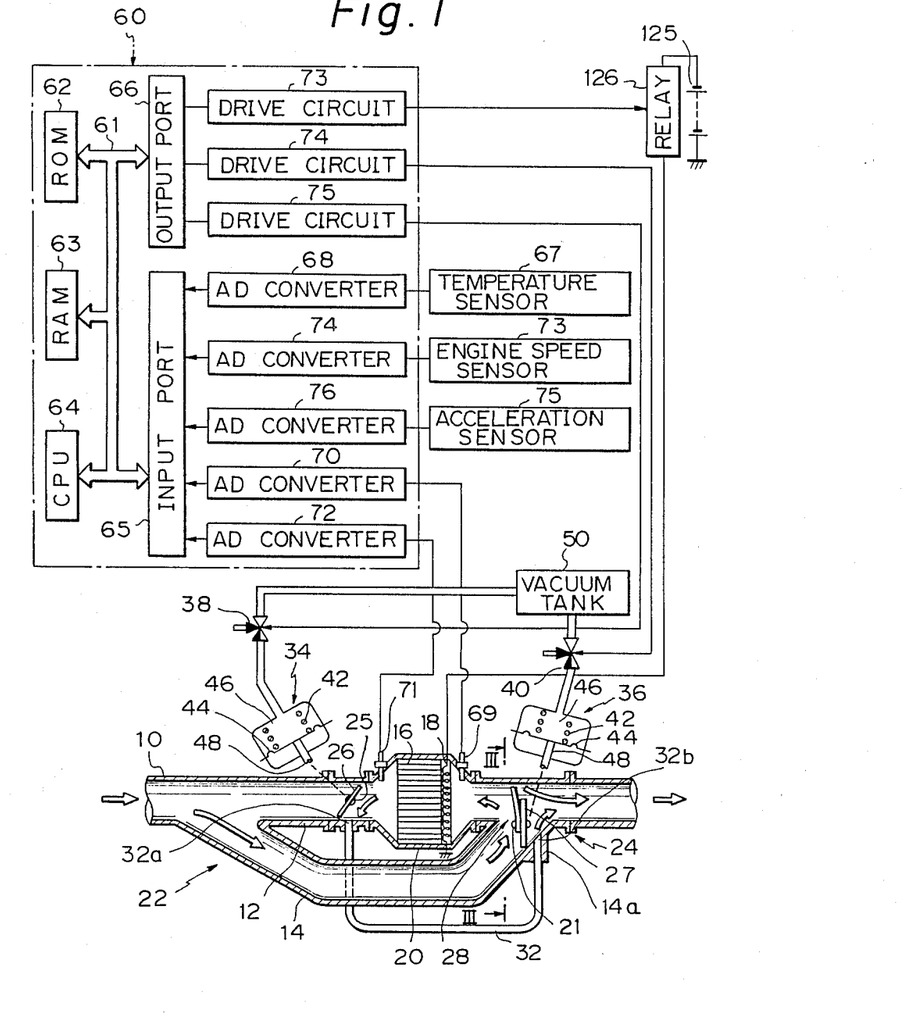
FIG. 1 is a sectional view of the first embodiment of a device of the present invention, in the case of trapping particles.
Figure 2:
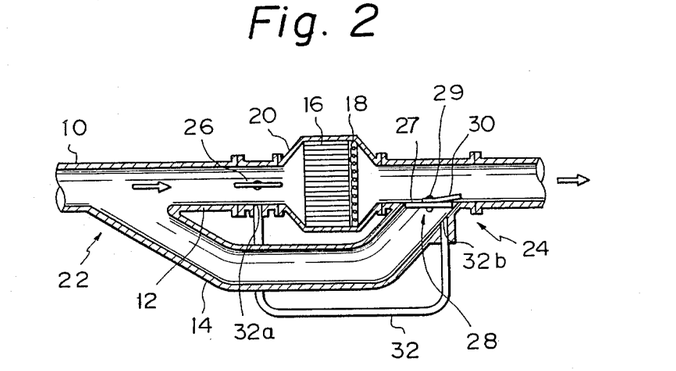
FIG. 2 is a sectional view of the first embodiment of a device of the present invention in the case of regenerating the filter.
Figure 3:
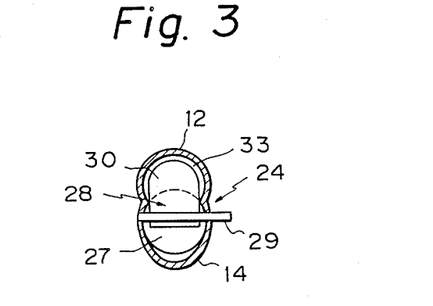
FIG. 3 is a cross-sectional view taken along the line III—III of FIG. 1.

The first embodiment of this invention is shown in FIG. 1, 2, and 3, wherein reference numeral 10 designates an exhaust pipe, and an exhaust gas from a Diesel engine (not shown) flows as shown by arrows. The exhaust pipe 10 is divided into a main exhaust pipe 12 and a first bypass pipe 14. A filter housing 20 is attached to the main exhaust pipe 12. The filter housing 20 accommodates a honeycomb ceramic filter 16 for trapping particles, and a heater 18, for example, an electric heater, for regenerating the filter 16. The first bypass pipe 14 is connected to the main exhaust pipe 12 at a portion 22 upstream of the filter 16 and at a portion 24 downstream of the heater 18. The first bypass pipe 14 is inclined to the main exhaust pipe 12 at the upstream portion 22 and the downstream portion 24 (as seen in FIG. 1 and 2).

As shown by the sectional view in FIG. 3, the downstream portion 24 is shaped like a figure eight, by connecting two circles.

One end 32a of a second bypass pipe 32 is connected to the main exhaust pipe 12 between the upstream portion 22 and the filter 16, and the other end 32b of the second bypass pipe 32 is connected to the first bypass pipe 14 near the downstream portion 24 at the lower wall 14a of the first bypass pipe 14. A first valve 26, e.g., a butterfly valve, is provided in the main exhaust pipe 12 near the end 32a of the second bypass pipe 32. When the first valve 26 is horizontal (first operation position (as seen in FIG. 2)), the main exhaust pipe 12 is fully open, and when the first valve 26 is in the second position (as shown in FIG. 1), the first valve 26 closes the main exhaust pipe 12, and thus one end 32a of the second bypass pipe 32 is communicated with the main exhaust pipe 12 between the first valve 26 and the filter 16.

A second valve 28 is provided at the downstream portion 24. The second valve 28 comprises a butterfly valve 27 and a plate portion 30 extending upward from a horizontal shaft 29 (as shown in FIG. 3). The diameter of the butterfly valve portion 27 is such that it can be introduced into the first bypass pipe 14, and the plate portion 30 extends into the main exhaust pipe 12. The second valve 28 is rotated about the shaft 29. The second valve 28 can take two operational positions, i.e., a first position wherein the second valve 28 is approximately horizontal (FIG. 2) and a second position wherein the second valve 28 is approximately vertical (FIG. 1 and 3). When in the first operation position (FIG. 2), the second valve 28 closes the first bypass pipe 14 and the end 32b of the second bypass pipe 32 by the butterfly valve portion 27 thereof and opens the main exhaust pipe 12, and the plate portion 30 is approximately parallel to the main exhaust pipe 12 and fully opens the main exhaust pipe 12. When in the second operation position (FIG. 1 and 3), the butterfly valve portion 27 of the second valve 28 closes the lower part of the first bypass pipe 14, and therefore, the first bypass pipe 1 is communicated with the main exhaust pipe 12 between the heater 18 and the second valve 28, and the other end 32b of the second bypass pipe 32 is communicated with the main exhaust pipe 12 downstream of the second valve 28, and the plate portion 30 reduces the flow area of the main exhaust pipe 12. An aperture 33 is defined between the outer peripheral portion of the plate portion 30 and the inner peripheral portion of the main exhaust pipe 12 (FIG. 3), whereby about nine-tenths of the exhaust gas flowing via the first bypass pipe 14 is made to flow downstream of the second valve 28 through the aperture 33, and the remainder of the exhaust gas to flow through the filter housing 20.

The first valve 26 is controlled by a first actuator 34 and a first solenoid valve 38, and the second valve 28 is controlled by a second actuator 36 and a second solenoid valve 40. The first and second actuators 34, 36 comprise a diaphragm 44, a vacuum chamber 46 defined by the diaphragm 44, a compressed spring 42 located in the vacuum chamber 46, and a control rod 48 secured to the diaphragm 44, respectively. The control rod 48 of the first actuator 34 is connected to the shaft 25 of the first valve 26, and the control rod 48 of the second actuator 36 is connected to the shaft 29 of the second valve 28. The vacuum chamber 46 of the first actuator 34 is connected to a vacuum tank 50 via the first solenoid valve 38 which communicates with the atmosphere. The vacuum chamber 46 of the second actuator 36 is connected to the vacuum tank 50 via the second solenoid valve 40 which is also communicated with the atmosphere. When each solenoid valve 38, 40 is ON, each vacuum chamber 46 is communicated with the vacuum tank 50, and the first and second valves 26 and 28 take the second operation position (FIG. 1). When each solenoid valve 38, 40 is OFF, each vacuum chamber 46 is communicated with the atmosphere by each of the solenoid valves 38, 40, and the first and second valves 26 and 28 take the first operation position (FIG. 2). The heater 18 is connected to a battery 125 via a relay 126.

The electronic control unit 60 is constructed as a digital computer and comprises a ROM (read only memory) 62, a RAM (random access memory) 63, a CPU (microprocessor, etc.) 64, an input port 65, and an output port 66. The ROM 62, the RAM 63, the CPU 64, the input port 65, and the output port 66 are interconnected via a bidirectional bus 61. A temperature sensor 67 detects a temperature of the engine cooling water, and the output signal of the temperature sensor 67 is input to the input port 65 via an AD converter 68. A second pressure sensor 69 is attached to the filter housing 20 at the right of the filter 16 (FIG. 1), and the output signal of the second pressure sensor 69 is input to the input port 65 via an AD converter 10. A first pressure sensor 71 is attached to the filter housing 20 at the left of the filter 16 (FIG. 1), and the output signal of the first pressure sensor 71 is input to the input port 65 via an AD converter 72. An engine speed sensor 73 detects an engine speed, and the output signal of the engine speed sensor 73 is input to the input port 65 via an AD converter 74. an acceleration sensor 75 detects an engine load, and the output signal of the acceleration sensor 75 is input to the input port 65 via an AD converter 76.

The output port 66 is connected to the relay 126 via a drive circuit 73, the second solenoid valve 40 via a drive circuit 74, and the first solenoid valve 38 via a drive circuit 75.

Figure 4:
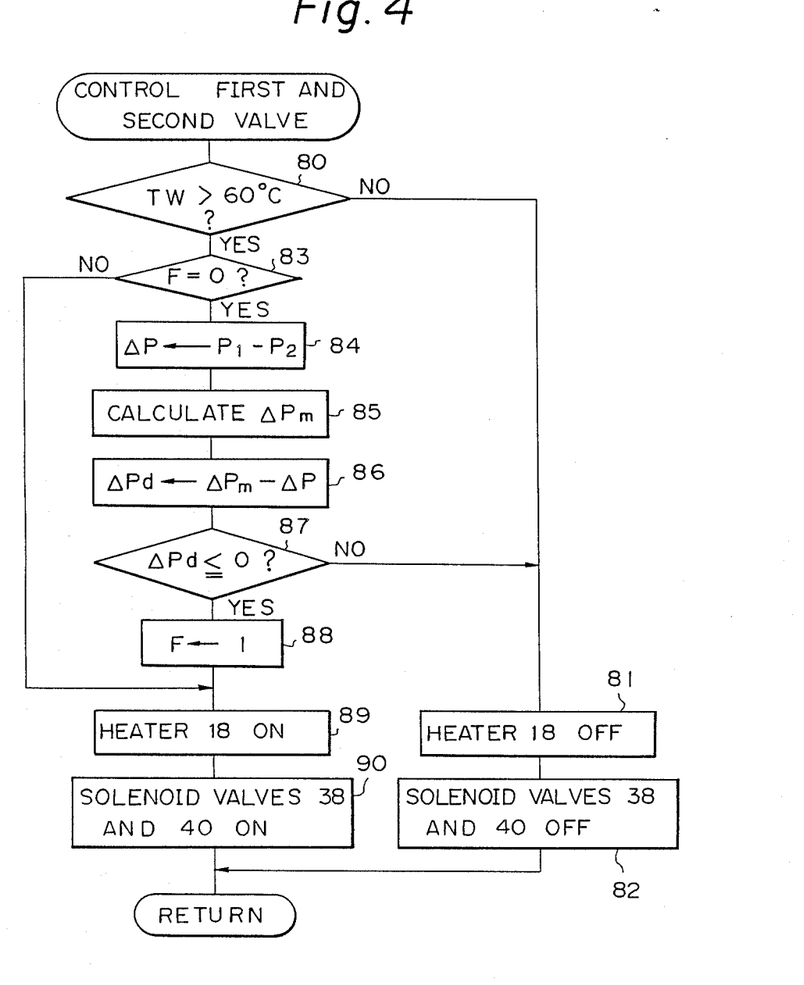
FIG. 4 is a flow chart of the control of the first and second valves.

FIG. 4 illustrates a routine for the control of the first and second valve 26 and 28.

Referring to FIG. 4, in step 80, it is determined whether or not the temperature of engine cooling water TW is higher than 60° C. If TW < =60° C., the routine goes to step 81 and the heater 18 is turned OFF. Then in step 82, the first and second solenoid valves 38 and 40 are made OFF, and therefore, the first and second valves 26 and 28 take the first operation position (FIG. 2), and thus exhaust gas from the Diesel engine is allowed to flow in the main exhaust pipe 12 and through the filter 16 and heater 18, and is discharged to the atmosphere. In this case particles in the exhaust gas are trapped in the filter 16. When TW is lower than 60° C., the regenerating operation of the filter 16 is prohibited.

This is because it is determined that, when the engine is warming up and TW is lower than 60° C., if the heater 18 is ON while the engine is warming up the battery 125 may be fully discharged, and thus the supply of electricity in the vehicle will be discontinued.

In step 80, if TW >60° C., the routine goes to step 83 and it is determined whether or not a flag F is set. If the flag F is set, the routine goes to step 89 and the regeneration of the filter 16 is carried out. If the flag F is not set, the routine goes to step 84 and $\Delta P$ is calculated from the following equation.

$$\Delta P = P_1 - P_2$$

Where $P_1$: a pressure detected by the first pressure sensor 71
$P_2$: a pressure detected by the second pressure sensor 69

$\Delta P$ shows a pressure loss of the filter 16, i.e., a degree of clogging of the filter 16. In step 85, $\Delta Pm$ is calculated. $\Delta Pm$ is a standard pressure loss of the filter 16 in accordance with the running condition of the engine, and is pre-memorized as a map of an engine load and an engine speed. Then, in step 86, $\Delta Pd$ is calculated from the following equation.

$$\Delta Pd = \Delta Pm - \Delta P$$

It is determined, on the basis of $\Delta Pd$, whether or not the regeneration of the filter 16 is carried out. In step 87, it is determined whether or not $\Delta Pd$ is equal to or less than 0. If $\Delta Pd > 0$, after the routine goes to step 81 and 82, the processing cycle is completed. In this case, as the filter 16 is not clogged, a regeneration of the filter 16 is not carried out. In step 87, if $\Delta Pd \leq 0$ the routine goes to step 88, and the flag F is set. In this case, since the degree of clogging of the filter 16 is large, a regeneration of the filter 16 is carried out. The flag F is maintained in the set state for a predetermined time, for example, 10 minutes, from when the flag F is set. In step 89 the heater 18 is turned ON, and in step 90, the first and second solenoid valves 38 and 40 are activated, and therefore, the first and second valves 26 and 28 take the second operation position (FIG. 1), and thus exhaust gas from the Diesel engine flows to the downstream portion 24 via the first bypass pipe 14. A large part of the exhaust gas flows downstream of the second valve 28 and about one-tenths of the exhaust gas flows through the heater 18, filter 16, the second bypass pipe 32, and the main exhaust pipe 12 downstream of the second valve 28, in that order.

Accordingly, the flow of exhaust gas in the filter housing 20 can be reversed when regenerating the filter 16, by the single first valve 26 and the single second valve 28, and thus the construction of the exhaust gas emission control device is simplified and it becomes easy to mount the device to a vehicle.

Further, since the end 32b of the second bypass pipe 32 opens in the first bypass pipe 14, the second bypass pipe 32 can be closed by closing the first bypass pipe 14, and accordingly, the size of the second valve 28 can be reduced.

Note, whether or not the regeneration of the filter 16 is to be carried out may be determined on the basis of the integrated engine revolution value.

The second valve 28 may be controlled by controlling the second solenoid valve 40 on a duty ratio basis.

The regeneration of the filter 16 may be considered completed on the basis of the pressure loss of the filter 16.

Figure 5:
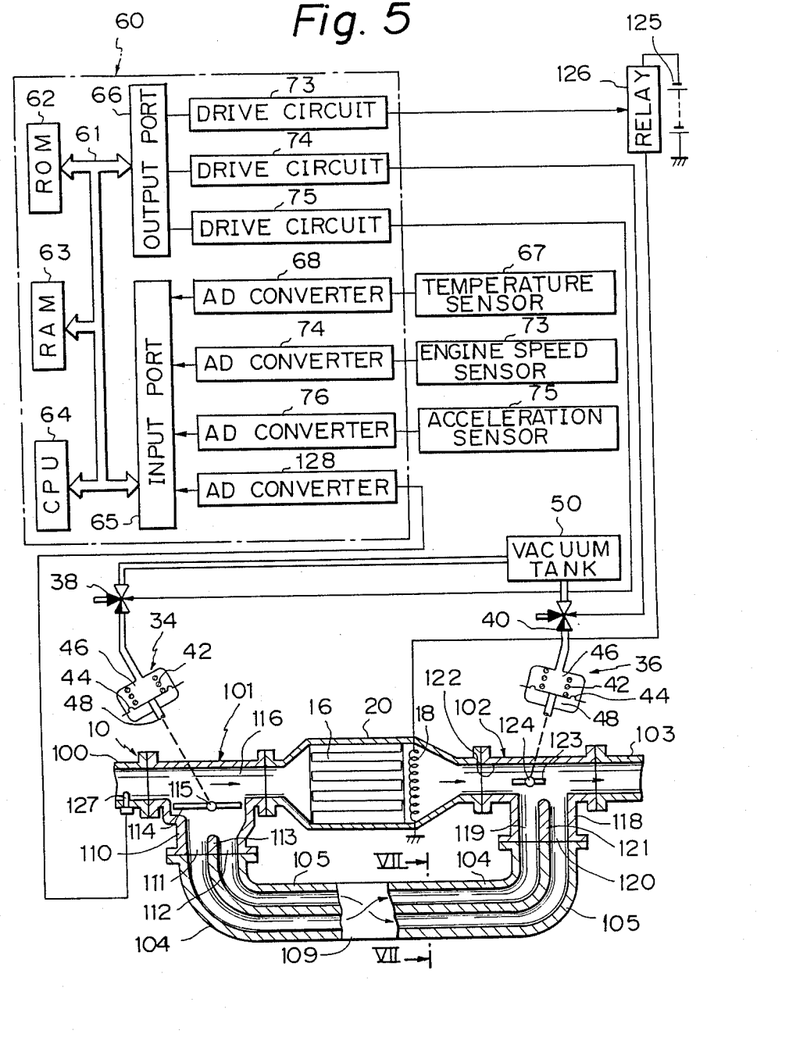
FIG. 5 is a sectional view of the second embodiment of a device of the present invention in the case of trapping particles.
Figure 6:
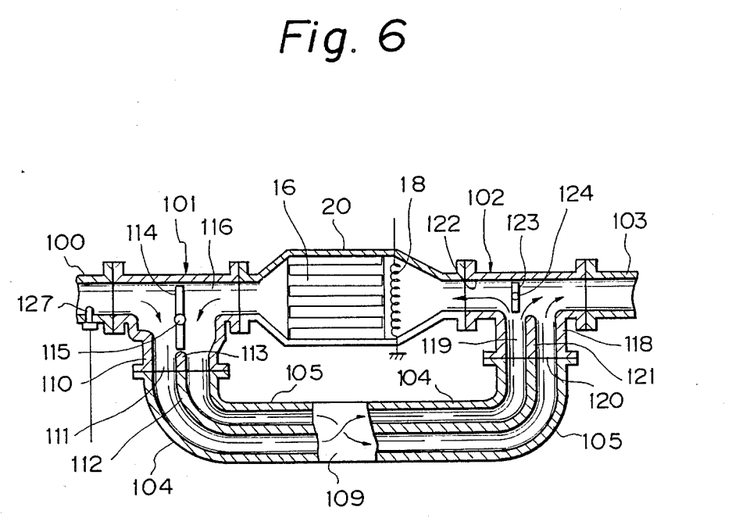
FIG. 6 is a sectional view of the second embodiment of a device of the present invention in the case of regenerating the filter.

FIGS. 5 and 6 illustrate a second embodiment of the present invention. In FIGS. 5 and 6 similar components are indicated by the same reference numerals, as used in FIG. 1.

Figure 7:
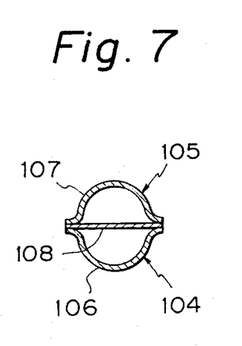
FIG. 7 is a cross-sectional view taken along the line VII—VII of FIG. 5.
Figure 8:
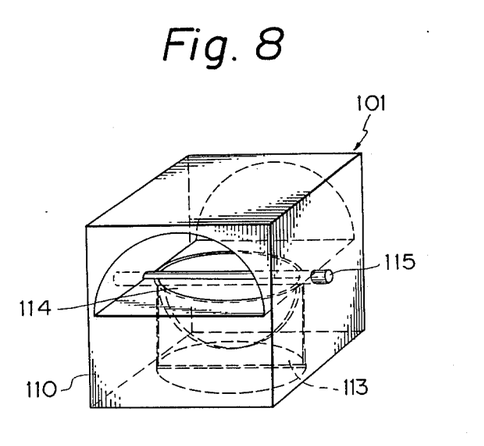
FIG. 8 is a perspective view of an upstream connecting portion.

Referring to FIGS. 5 and 6, the exhaust pipe 10 comprises an upstream exhaust pipe 100, an upstream connecting portion 101, a downstream connecting portion 102 and a downstream exhaust pipe 103. The filter 16 is accommodated in the filter housing 20, which is provided between the upstream connecting portion 101 and the downstream connecting portion 102. The right end of the upstream exhaust pipe 100 is connected to the upstream connecting portion 101 and the left end of the upstream exhaust pipe 100 is connected to an exhaust manifold (not shown). The left end of the downstream exhaust pipe 103 is connected to the downstream connecting portion 102 and the right end of the downstream exhaust pipe 103 is communicated with the atmosphere. First and second bypass pipes 104 and 105 connect the upstream connecting portion 101 to the downstream connecting portion 102. As shown in FIG. 7, the first and second bypass pipes 104 and 105 are defined by half cylindrical portions 106 and 107 and a dividing plate 108, and therefore, the first and the second bypass pipes 104 and 105 are adjacent to each other. The first and the second pipes 104 and 105 are twisted at the middle portion 109, and therefore, the first bypass pipe 104 is located under the second bypass pipe 105 near the upstream connecting portion 101 and the first bypass pipe 104 is located on the second bypass pipe 105 near the downstream connecting portion 102.

The upstream connecting portion 101 is provided with a coupling portion 110 extending downward in FIG. 5, and first and second ports 111 and 112 are defined in the coupling portion 110 by a partition 113. The first and second parts 111 and 112 are communicated with the first and second bypass pipes 104 and 105, respectively. A changeover valve 114 is provided in the upstream connecting portion 101, and is rotatable supported by a shaft 115 provided above the partition 113. When the changeover valve 114 takes a first operation position (FIG. 5), it closes the first and second ports 111 and 112, and communicates the upstream exhaust pipe 100 with the filter housing 20. When the changeover valve 114 takes a second operation position (FIG. 6), it opens the first and second ports 111 and 112, and shuts off the communication between the upstream exhaust pipe 100 and the filter housing 20. The changeover valve 114 is connected to and controlled by the first actuator 34 via the rod 48. The first actuator 34 is controlled by the electronic control unit 60 via the first solenoid valve 38.

Figure 9:
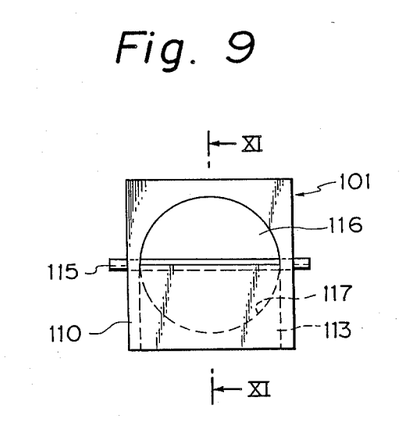
FIG. 9 is a elevational view of an upstream connecting portion.
Figure 10:
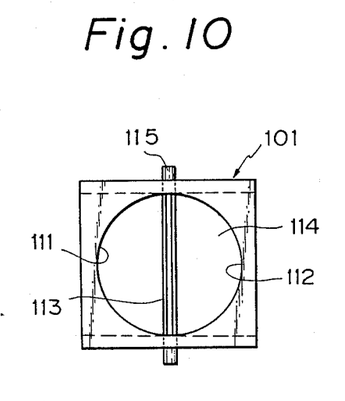
FIG. 10 is a bottom view of an upstream connecting portion.
Figure 11:
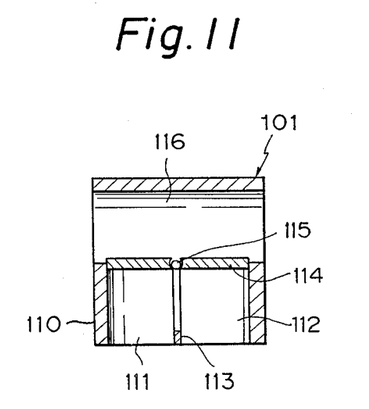
FIG. 11 is a cross-sectional view taken along the line XI—XI of FIG. 9.

FIGS. 8 to 11 illustrate the upstream connecting portion 101 and the changeover valve 114. The changeover valve 114 is a disklike butterfly valve, and when the changeover valve 114 is in a horizontal position, i.e., the first operation position, it closes the first and second ports 111 and 112, and opens a horizontal passage 116 defined in the upstream connecting portion 101. The horizontal passage 116 has a half circle section (FIG. 9), and a half circle notch 117 is formed on the partition 113 (FIG. 9). When the changeover valve 114 is in a vertical position, i.e., the second operation position, it opens the first and second ports 111 and 112, and closes the horizontal passage 116.

Returning to FIGS. 5 and 6, the downstream connecting portion 102 is provided with a coupling portion 118 extending downward and having third and fourth ports 119 and 120 defined therein by a partition 121, which are communicated with the first and second bypass pipes 104 and 105, respectively. The notch 117 formed on the partition 113 is not formed on the partition 121, and thus the partition 121 extends to the lower portion of the horizontal passage 122. A flow control valve 123 is rotatable supported by a shaft 124, and when the flow control valve 123 is in a horizontal position, i.e., a first operating position (FIG. 5), the flow control valve 123 opens the third port 119 and the horizontal passage 122, and when the flow control valve 123 is in a vertical position, i.e., a second operating position (FIG. 6), the top end of the flow control valve 123 is in contact with the upper inner wall of the horizontal passage 122, and the bottom end of the flow control valve 123 is located at the third port 119. The fourth port 120 is always communicated with the horizontal passage 122. The flow control valve 123 is connected to and controlled by the second actuator 36 via the rod 48. The second actuator 36 is controlled by the electronic control unit 60 via the second solenoid valve 40.

The electrical heater 18 is provided in the filter housing 20 at the right of the filter 16 (FIGS. 5 and 6), and is connected to a battery 125 via a relay 126. When regenerating the filter 16, the heater 18 is switched ON and radiates heat, whereby particles trapped in the filter 16 are ignited and burned. A pressure sensor 127 is attached to the upstream exhaust pipe 100, and the output signal of the pressure sensor 127 is input to the input port 65 via an AD converter 128. Whether or not the regeneration of the filter 16 is carried out is determined by comparing the pressure detected by the pressure sensor 127 with the standard pressure based on the engine speed and the engine load. The changeover valve 114 and the flow control valve 123 are controlled in the same way as in the first embodiment, by the electronic control unit 60.

When trapping particles, the changeover valve 114 and the flow control valve 123 take the first operation position (FIG. 5). Namely, the changeover valve 114 closes the first and second ports 111 and 112, and the flow control valve 123 fully opens the horizontal passage 122 and the third port 119. Therefore, exhaust gas flowing through the upstream exhaust pipe 100 flows into the filter housing 20 via the upstream connecting portion 101, flows to the downstream connecting portion 102 through the filter 16 and the heater 18, and is released to the atmosphere from the downstream exhaust pipe 103. In this case, particles contained in the exhaust gas are trapped by the filter 16.

When regenerating the filter 16, the changeover valve 114 and the flow control valve 123 take the second operation position (FIG. 6). Namely, the changeover valve 114 divides the horizontal passage 116 into an upstream passage and a downstream passage, and opens the first and second ports 111 and 112. The flow control valve 123 closes the upper portion of the horizontal passage 122 and divides the upper end of the third port 119 into a left portion and a right portion. Therefore, exhaust gas flows into the first bypass pipe 104 from the upstream exhaust pipe 100, and at the third port 119, exhaust gas flows to the filter housing 20 and the downstream exhaust pipe 103. Exhaust gas flowing into the filter housing 20 flows to the second bypass pipe 105 through the heater 18, filter 16, and the upstream connecting portion 101. Exhaust gas flowing through the second bypass pipe 105 is released to the atmosphere from the downstream exhaust pipe 103. In this case, the heater 18 is switched ON and radiates heat, whereby particles trapped in the filter 16 are ignited and burned.

The first and second bypass pipes 104 and 105 are connected to the upstream connecting portion 101 adjacent to each other, and the single changeover valve 114 is provided at this upstream connecting portion 101. Similarly, the first and second bypass pipes 104 and 105 are connected to the downstream connecting portion 102 adjacent to each other, and the single flow control valve 123 is provided at this downstream connecting portion 102. Therefore only the single changeover valve 114 and the single flow control valve 123 are required to reverse the flow of exhaust gas in the filter housing 20 when regenerating the filter 16. Further, since the number of the actuators 34, 36 corresponds to the number of the valves 114, 123, the number of actuators can be reduced compared to the prior device, and thus the construction of the exhaust gas emission control device simplified, and the control of the valves 114 and 123 simplified.

Note, in the second operation, the lower end of the flow control valve 123 may come into contact with the upper end of the partition 121, and a notch or a hole may be formed at this contacting portion.

Figure 12:
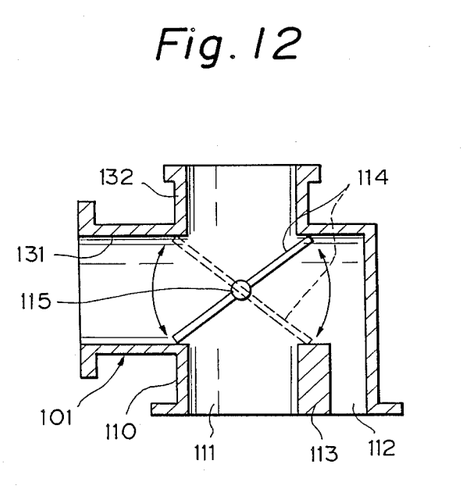
FIG. 12 is a sectional view of another embodiment of the upstream connecting portion.

FIG. 12 illustrates another embodiment of the upstream connecting portion 101 and the changeover valve 114. In this upstream connecting portion 101, a cylindrical portion 131 connected to the upstream exhaust pipe 100 (FIGS. 1 and 2) and a cylindrical portion 132 connected to the filter housing 20 (FIGS. 1 and 2) are at a right angle to each other, and the first port 111 connected to the first bypass pipe 104 has a larger flow section area than the second port 112 connected to the second bypass pipe 105. The changeover valve 114 is rotatable supported by the shaft 115, and when in the first operation position shown by a solid line, the changeover valve 114 closes the first and second ports 111 and 112, and when in the second operation position shown by a broken line, the changeover valve 114 communicates the first port 111 with the upstream exhaust pipe 100, and communicates the second port 112 with the filter housing 20. The use of this changeover valve 114 allows effects similar to those of the first embodiment to be obtained.

What is claimed:

1. An exhaust gas emission control device for a Diesel engine having an exhaust passage for discharging exhaust gas to the atmosphere, said device comprising:
 a filter provided in the exhaust passage for trapping particles in the exhaust gas;
 heater means provided near said filter to ignite particles accumulated on said filter when regenerating said filter;
 first passage means connecting a first connecting portion located upstream of said filter to a second connecting portion located downstream of said filter;
 second passage means connecting a third connecting portion located upstream of said filter to a fourth connecting portion located downstream of said filter;
 a single first valve provided in an upstream portion of said filter;

a single second valve provided in a downstream portion of said filter; and control means for controlling said first and second valves, said control means controlling said first and second valves in such a manner that, when it is determined that a regeneration of said filter is not to be carried out, at least one of said first valve and said second valve closes said first and second passage means at at least one of said first and third connecting portion and said second and fourth connecting portion, and said first and second valves open the exhaust passage, whereby exhaust gas flows through said filter and said heater means, and when it is determined that a regeneration of said filter is to be carried out, said first valve closes the exhaust passage between said first connecting portion and said third connecting portion, and said second valve is open to a predetermined degree, so that exhaust gas flows into said first passage means, and a part of the exhaust gas flowing via said first passage means flows through said heater means, said filter, and said second passage means.

2. An exhaust gas emission control device according to claim 1, wherein said second and fourth connecting portions are overlapped, said first and second passage means merging with each other so that, when trapping particles, said second valve closes the first and second passage means at said second connecting portion, and when regenerating said filter, said first passage means is communicated with the exhaust passage upstream of said second valve at said second connecting portion and said second passage means is communicated with the exhaust passage downstream of said second valve at said second connecting portion.

3. An exhaust gas emission control device according to claim 2, wherein said first passage means is inclined to the exhaust passage at said second connecting portion, said second valve is provided at said second connecting portion, and the merging portion of said first and second passage means is located near said second connecting portion.

4. An exhaust gas emission control device according to claim 3, wherein said second valve comprises a butterfly valve portion and a plate portion, when trapping particles, said first and second passage means is closed at said second connecting portion by said butterfly valve portion, and when regenerating said filter, said plate portion reduces a flow area of the exhaust passage at said second connecting portion.

5. An exhaust gas emission control device according to claim 1, wherein said first connecting portion is located upstream of said third connecting portion.

6. An exhaust gas emission control device according to claim 5, wherein said first and third connecting portions are adjacent to each other, said first valve is provided between said first and third connecting portions, and when trapping particles, said first valve closes said first and second passage means at said first and third connecting portions, and when regenerating the filter, said first valve opens said first and second passage means at said first and third connecting portions.

7. An exhaust gas emission control device according to claim 6, wherein said first valve is a butterfly valve, a section shape of the exhaust passage at said first and third connecting portion is a half circle and a half circle-shaped notch is formed on a partition between said first and second passage means against said first valve.

8. An exhaust gas emission control device according to claim 5, wherein the exhaust passage comprises an upstream exhaust passage upstream of said first valve and a downstream exhaust passage downstream of said first valve, said upstream exhaust passage being inclined to said downstream exhaust passage, when trapping particles, said first valve communicates said upstream exhaust passage with said downstream exhaust passage, and closes communication between the exhaust passage and said first and second passage means at said first and third connecting portions, and when regenerating the filter, said first valve communicates said upstream exhaust passage with said first passage means and said downstream exhaust passage with said second passage means.

9. An exhaust gas emission control device according to claim 8, wherein said upstream and downstream exhaust passages are at a right angle to each other.

10. An exhaust gas emission control device according to claim 1, wherein said second connecting portion is located upstream of said fourth connecting portion.

11. An exhaust gas emission control device according to claim 10, wherein said second and fourth connecting portions are adjacent to each other said second valve is provided at said second connecting portion, said second passage means is always communicated with the exhaust passage downstream of said second valve, and then trapping particles said second valve opens the exhaust passage, and when regenerating said filter, said second valve divides the exhaust passage into an upstream side and a downstream side at said second connecting portion.

12. An exhaust gas emission control device according to claim 1, wherein a sectional area of said first passage means is larger than a sectional area of said second passage means.

13. An exhaust gas emission control device according to claim 1, further comprising a pressure sensor, wherein said control means determines whether or not the regeneration of said filter is carried out based on the exhaust gas pressure detected by said pressure sensor.

14. An exhaust gas emission control device according to claim 1, further comprising a first pressure sensor upstream of said filter and a second pressure sensor downstream of said filter, wherein said control means determines whether or not the regeneration of said filter is carried out based on the pressure loss detected by said first and second pressure sensor.

15. An exhaust gas emission control device according to claim 1, further comprising an integrated engine revolution detecting means, wherein said control means determines whether or not the regeneration of said filter is carried out based on the integrated engine revolution.

* * * * *